(12) United States Patent
van Grieken et al.

(10) Patent No.: US 8,747,024 B2
(45) Date of Patent: Jun. 10, 2014

(54) PIPELINE SUPPORT

(75) Inventors: Gerardus Cornelius van Grieken, Noordwijkerhout (NL); Jean Louis Antoine de Grave, Bussum (NL); Erwan Karyadi, Delft (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 170 days.

(21) Appl. No.: 13/129,451

(22) PCT Filed: Nov. 18, 2009

(86) PCT No.: PCT/NL2009/000224
§ 371 (c)(1),
(2), (4) Date: May 16, 2011

(87) PCT Pub. No.: WO2010/059035
PCT Pub. Date: May 27, 2010

(65) Prior Publication Data
US 2011/0226373 A1    Sep. 22, 2011

Related U.S. Application Data

(60) Provisional application No. 61/116,956, filed on Nov. 21, 2008.

(30) Foreign Application Priority Data

Dec. 5, 2008   (NL) ..................... 2002291

(51) Int. Cl.
*F16L 1/12*   (2006.01)
*F16L 1/06*   (2006.01)
(52) U.S. Cl.
CPC ..................... *F16L 1/065* (2013.01)
USPC ...................................... 405/166

(58) Field of Classification Search
USPC ............... 405/154.1, 158, 166; 138/106, 107; 248/49, 65, 73, 74.1
See application file for complete search history.

(56) References Cited

U.S. PATENT DOCUMENTS 1,703,605 A * 2/1929 Ballantyne .................... 138/106
5,458,441 A * 10/1995 Barry ............................ 405/170

(Continued)

FOREIGN PATENT DOCUMENTS

| FR | 2 922 623 A1 | 4/2009 |
| GB | 2 339 251 A | 1/2000 |
| GB | 2 364 758 A | 2/2002 |
| WO | 2009/053599 A2 | 4/2009 |

*Primary Examiner* — Tara M. Pinnock
*Assistant Examiner* — Patrick Lambe
(74) *Attorney, Agent, or Firm* — Hoffmann & Baron, LLP

(57) ABSTRACT

A J-lay system constructed to be positioned on board a pipeline-laying vessel, comprising a fixed pipeline support (12) and a movable pipeline support (12) configured for supporting a pipeline (10) which is suspended form the pipeline-laying vessel, —the movable pipeline support (12) comprising: —at least a first movable support member (20A) configured for engaging a first collar (16A) on the pipeline (10), —at least a second movable support member (20B) configured for engaging a second collar (16B) on the pipeline (10), —the fixed pipeline support (12) comprising: —at least a first fixed support member (20A) configured for engaging a third collar on the pipeline (10), —at least a second fixed support member (20B) configured for engaging a fourth collar on the pipeline (10), wherein the first (20A) and second fixed support member (20B) configured for engaging a fourth collar on the pipeline (10).

12 Claims, 4 Drawing Sheets

(56) References Cited

U.S. PATENT DOCUMENTS

| | | | |
|---|---|---|---|
| 5,797,702 A * | 8/1998 | Drost et al. | 405/166 |
| 6,142,428 A * | 11/2000 | Kamata et al. | 248/68.1 |
| 6,273,643 B1 * | 8/2001 | Baugh | 405/166 |
| 6,729,803 B1 * | 5/2004 | Baylot | 405/168.4 |
| 2007/0264084 A1 * | 11/2007 | Signaroldi et al. | 405/158 |
| 2010/0310319 A1 | 12/2010 | Pionetti | |

* cited by examiner

PIPELINE SUPPORT

CROSS-REFERENCE TO RELATED APPLICATIONS

This application is the National Stage of International Application No. PCT/NL2009/000224, filed Nov. 18, 2009, which claims the benefit of Netherlands Application No. NL 2002291, filed Dec. 5, 2008, and U.S. Provisional Application No. 61/116,956, filed Nov. 21, 2008, the contents of which are incorporated by reference herein.

FIELD OF THE INVENTION

The present invention relates to a pipeline support, to a pipeline or pipe section, to a combination of a pipeline or pipe section and a pipeline support, and to a method for supporting a pipeline. The present invention also relates to a pipeline laying vessel having such a pipeline support.

BACKGROUND OF THE INVENTION

Methods and devices for laying pipelines are widely known. One method of laying a pipeline is the so-called J-lay method. Other methods are also known, such as S-lay.

Generally, the pipeline which is laid is suspended at a free end from a pipeline laying vessel during the laying thereof. New pipe sections are joined to the free end during the laying of the pipeline.

Generally, at a point at which the free end of the pipeline is suspended from the vessel, hereinafter referred to as the suspension point, large forces are transferred from the pipeline to the vessel. In the field of marine pipelaying, there is a gradual development that pipelines are laid in ever increasing water depths. This implies that longer and heavier pipelines are suspended from the vessel and thus, the force which is exerted on the pipeline support by the pipeline shows a gradual increase over time.

In one method of pipelaying, the forces are transferred from the pipeline to the vessel via a collar on the pipeline which engages a pipeline support on the vessel.

A problem which is encountered is that the forces may become too great for a collar of a known size. In some cases, it may be an option to increase the size of the bearing area of the collar. However, this is not always possible or preferable. A bigger diameter generally means an increase in cost. In the case collars are made from thick walled pipe, there may be fabrication limits to the outer diameter of the collar.

Also, for pipe-in-pipe systems of the sliding type, on certain locations collars may be required on the inner pipe. The outer diameter of a collar on an inner pipe may become too large to fit within the inner diameter of the outer pipe. In such a situation, an increase in the size of the collar would necessitate a larger outer diameter of the outer pipe. This in turn substantially increases the cost of the total pipeline system.

Another problem encountered in the prior art is that the forces which are transferred from the pipeline to the pipeline support induce stress concentrations in the pipeline or in the pipeline support. Generally, the contact between the pipeline and the pipeline support occurs in a support surface. Depending on the situation, these local stress peaks may become too high and damage may occur in the pipeline or in the pipeline support.

U.S. Pat. No. 5,458,441 discloses an example of a traditional J-lay system. One of the embodiments shows each pipeline section containing two collars. A movable clamp 32 engages a bearing area on a first collar 12, a fixed clamp 34 engages a bearing area on a second collar 18. No load sharing between the two collars occurs during lowering of the pipeline or during adding a new pipe section. When loads in the pipeline increase, the bearing areas of the respective collars have to increase in order to carry the load. This will lead to an increased overall wall thickness and thus a larger protrusion of the collars from the pipeline wall. An increase of wall thickness generally leads to an increase of production cost and makes it more difficult to manufacture collars with the desired mechanical properties.

U.S. Pat. No. 6,273,643 discloses a similar system as U.S. Pat. No. 5,458,441 and has a similar disadvantages.

U.S. Pat. No. 6,729,803B1 discloses a system which is based on friction. Shoes 17 are provided having bearing surfaces 21, A number of different shoes 17 are provided in different planes 11, which are vertically spaced from one another, see FIG. 3. Some load sharing occurs between the planes 11, see column 8, lines 51-67. However, a disadvantage of U.S. Pat. No. 6,729,803 is that it is difficult to ensure a proper distribution of the forces between the levels 11. In practice, the actual distribution of the forces will be relatively unpredictable.

SUMMARY OF THE INVENTION

It is an object of the invention to provide an improved J-lay system.

It is another object of the invention to provide a J-lay system which allows higher loads from the pipeline to be transferred to the pipeline laying vessel.

It is another object of the invention to provide a J-lay system which creates lower stress peaks in the pipeline and/or the pipeline support for a given load.

It is another object of the invention to provide a J-lay system which allows smaller collars to be used.

It is another object of the invention to provide a J-lay system which allows more cost-effective pipe-in-pipe systems.

It is another object of the invention to provide a J-lay system which allows a predictable way to transfer the forces from the pipeline to the J-lay system.

At least one object is achieved by a J-lay system constructed to be positioned on board a pipeline-laying vessel, the J-lay system comprising a fixed pipeline support and a movable pipeline support configured for supporting a pipeline which is suspended from the pipeline-laying vessel, the movable pipeline support comprising:
at least a first movable support member configured for engaging a first collar on the pipeline,
at least a second movable support member configured for engaging a second collar on the pipeline,
wherein the first and second movable support members are spaced apart at a movable support member distance along an intended firing line, wherein the first movable support member is resiliently mounted according to a substantially predetermined load-movement relationship relative to the second movable support member, the fixed pipeline support comprising:
at least a first fixed support member configured for engaging a third collar on the pipeline,
at least a second fixed support member configured for engaging a fourth collar on the pipeline,
wherein the first and second fixed support member are spaced apart at a fixed support member distance along an intended firing line, wherein the first fixed support member is resiliently mounted according to a substantially predetermined load-movement relationship relative to the second fixed support member.

The J-lay system of the invention allows a distribution of the total axial load over at least two support members of the movable pipeline support or over at least two support members of a fixed pipeline support which are placed along the firing line of a J-lay system on board a pipeline laying vessel. Thus, each support member and each corresponding collar on the pipeline may carry a smaller load than the total axial load. In the invention, the distribution of the forces is no longer dependent on the amount of slip, as it is in U.S. Pat. No. 6,729,803. This is an advantage and increases the predictability of the distribution of the forces. Further the overall wall thickness of the collar can be reduced, allowing more cost effective fabrication as well as more control over the mechanical properties.

The movable pipeline support (sometimes indicated as a travelling block) is generally movably arranged on a tower-like construction and can make a stroke from an upper position to a lower position in order to lower a pipeline in a pipeline laying process.

The fixed pipeline support (sometimes indicated as a hang-off table) is generally provided in or below a welding station in which a new pipe section is joined to a free end of the pipeline which is suspended via the fixed pipeline support.

The total load may be distributed substantially evenly, but may also be distributed non-evenly in certain cases.

Multiple collars may be provided on the pipeline, spaced apart from one another such that in use, the combined collars transfer the total load of the pipeline to the vessel.

In a suitable embodiment,
the movable pipeline support is configured such that when a load is exerted on the first movable support member, the first movable support member moves in the direction of the second movable support member over a substantially predetermined distance, thereby decreasing the movable support member distance,
and
the fixed pipeline support is configured such that when a load is exerted on the first fixed support member, the first fixed support member moves in the direction of the second fixed support member over a substantially predetermined distance, thereby decreasing the fixed support member distance.

In this way, a relatively accurate load distribution is possible. A third and potentially even more support members can be provided, further reducing the load which each support member carries, and thereby giving the opportunity to further reduce the overall wall thickness of the collar.

In a suitable embodiment, the first and second movable support member are connected to one another via a movable frame, and the first and second fixed support member are connected to one another via a fixed frame, wherein at least part of the movable frame and at least a part of the fixed frame is configured to deform substantially elastically, such that the movable frame and the fixed frame act as a spring having the substantially predetermined load-movement relationship. A frame which deforms elastically is a simple and reliable way of creating a predetermined load-movement relationship.

In an embodiment, the at least first and second movable support members are integral with a movable frame connecting the at least first and second support members, and the at least first and second fixed support members are integral with a fixed frame connecting the at least first and second support members. An integral pipeline support, both for the movable and fixed pipeline support, is strong, easy to manufacture and reliable.

In another suitable embodiment, the substantially predetermined load-movement relationship is configured such that when in use the first collar of the pipeline exerts a typical load on the first movable support member, the first movable support member moves such a distance that the second collar of the pipeline engages the second movable support member, and that when in use the third collar of the pipeline exerts a typical load on the first fixed support member, the first fixed support member moves such a distance that the fourth collar of the pipeline engages the second fixed support member.

In a non-loaded state, the second collar does not engage the second movable support member and a gap exists between the second collar and the second movable support member. When the weight of the pipeline is added, the second collar approaches the second movable support member and at a substantially predetermined load engagement occurs. The same mechanism applies for the fourth collar and the second fixed support member when the pipeline is suspended from the fixed pipeline support.

In another embodiment, the support members are angled obliquely relative to the projected firing line. In other words, the support members taper with respect to the intended firing line. This provides a possibility of reducing the distance over which the collars protrude from the wall of the pipeline. The angled support members are constructed to engage tapering collars on the pipe section or pipeline.

In a suitable embodiment, the support member distance is adjustable. This allows the force distribution to be more accurately controlled. For this end an active system may be used, where the support member(s) which is (are) loaded above average is (are) lowered and the support member(s) which is (are) loaded below average is (are) raised. These options of variation can be achieved by this embodiment.

The invention also relates to a pipeline or pipe section constructed to be supported by a J-lay system comprising a fixed pipeline support and a movable pipeline support, the pipeline or pipe section comprising:
 a first set of collars comprising at least a first collar and a second collar constructed to engage the movable pipeline support of a J-lay system, wherein the second collar is positioned at a collar distance from the first collar in the longitudinal direction of the pipeline or pipe section,
 a second set of collars comprising at least a third collar and a fourth collar constructed to engage the fixed pipeline support of a J-lay system, wherein the fourth collar is positioned at a collar distance from the third collar in the longitudinal direction of the pipeline or pipe section,
 the first collar being configured to engage a first movable support member of the movable pipeline support,
 the second collar being configured to engage a second movable support member of the movable pipeline support,
 the third collar being configured to engage a first fixed support member of the fixed pipeline support,
 the fourth collar being configured to engage a second fixed support member of the fixed pipeline support,
 wherein the pipe section between the first and second collar and between the third and fourth collar is resilient according to a predetermined load-elongation relationship, such that when in use a certain axial load is applied on the first collar or on the third collar, the collar distance increases a substantially predetermined value such that the second collar engages the second movable support member or the fourth collar engages the second fixed support member.

This embodiment uses the pipeline itself as a spring with a known spring constant, thereby effectively distributing the total load over the collars.

Generally, the collars protrude from a wall of the pipeline. This is a simple way of applying the present invention. As explained before, it can be advantageous from cost and quality point of view to limit the protrusion.

In a suitable embodiment, the collars extend around the outer wall of the pipeline or pipe section. Collars are a simple and reliable way of creating support surfaces on the pipeline.

The invention further relates to a combination of a J-lay system and a pipeline or a pipe section, the J-lay system comprising a fixed pipeline support and a movable pipeline support configured for supporting a pipeline which is suspended from the pipeline-laying vessel,
the movable pipeline support comprising:
at least a first movable support member configured for engaging a first collar on the pipeline,
at least a second movable support member configured for engaging a second collar on the pipeline,
wherein the first and second movable support members are spaced apart at a movable support member distance along an intended firing line,
the fixed pipeline support comprising:
at least a first fixed support member configured for engaging a third collar on the pipeline,
at least a second fixed support member configured for engaging a fourth collar on the pipeline,
wherein the first and second fixed support member are spaced apart at a fixed support member distance along an intended firing line,
the pipeline or pipe section comprising:
a first set of collars comprising at least a first collar and a second collar constructed to engage a movable pipeline support of a J-lay system, wherein the second collar is positioned at a collar distance from the first collar,
a second set of collars comprising at least a third collar and a fourth collar constructed to engage a fixed pipeline support of a J-lay system, and wherein the fourth collar is positioned at a collar distance from the third collar,
wherein:
the first collar is configured to engage the first movable support member,
the second collar is configured to engage the second movable support member,
the third collar is configured to engage the first fixed support member,
the fourth collar is configured to engage the second fixed support member,
wherein:
a) the first movable support member is resiliently mounted according to a substantially predetermined load-movement relationship relative to the second movable support member, and the first fixed support member is resiliently mounted according to a substantially predetermined load-movement relationship relative to the second fixed support member, such that the second collar engages the second movable support member or the fourth collar engages the second fixed support member
and/or
wherein the pipe section between the first and second collar and between the third and fourth collar is resilient according to a predetermined load-elongation relationship, such that when in use a certain axial load is applied on the first collar or on the third collar, the collar distance increases a substantially predetermined value such that the second collar engages the second movable support member or the fourth collar engages the second fixed support member.

In a suitable embodiment, the collar distance is smaller than the support member distance.

In a suitable embodiment, the difference between the collar distance and the movable and fixed support member distance is tuned to the substantially predetermined load-movement relationship of the support members of the movable and fixed pipeline support and/or to the substantially predetermined load-elongation relationship of the pipeline or pipe section between the collars, such that:
the second collar engages the second movable support member when the load on the first support member is a predetermined portion of the projected total load of the pipeline on the vessel and
the fourth collar engages the second fixed support member when the load on the first fixed support member is a predetermined portion of the projected total load of the pipeline on the vessel.

In a suitable embodiment, the predetermined portion is between 30% and 70% of the projected total load of the pipeline on the vessel, in particular between 40% and 60% of the total load. The present invention allows a more or less equal load distribution.

In a suitable embodiment, the pipeline comprises six or more collars spaced apart in the direction of a main longitudinal axis of the pipeline, three or more collars for the movable pipeline support and three or more collars for the fixed pipeline support and wherein the movable pipeline support comprises three or more movable support members which are spaced apart, and wherein the fixed pipeline support comprises three or more fixed support members which are spaced apart and wherein the distances between the collars are smaller than the distances between the movable support members and between the fixed support members and wherein the load-movement relationships and the load elongation relationships are chosen such that in use, the total load which the pipeline exerts on the pipeline laying vessel is spread over the respective collars which engage the movable pipeline support or over the collars which engage the fixed pipeline support.

When multiple collars are applied, each collar can be relatively small, which allows a reduction of the width of the collars when compared to a single collar.

In a preferred embodiment, the fixed and movable pipeline support compress in the same order in response to a certain load as the pipeline extends in response to the same load, such that the difference between the collar distance and the support member distance is closed by both an increase in the distance between the respective collars of the pipeline or pipe section as a decrease in the distance between the support members. In this embodiment, the deformation capability of all material is used effectively and the elastic properties of both pipeline and support structure are used.

In another embodiment, the movable and fixed pipeline support between the respective first and second support members compress much more in response to a certain load than the extension of the pipeline between the first and second collars and between the third and fourth collars in response to the same load, such that the greater part of the difference between the collar distance and the support member distance is closed by a decrease in the distance between the respective support members.

In this embodiment, the strain in the pipeline is small in comparison to the strain in the pipeline support.

The words "much more" indicate that the decrease in the support member distance is at least three times, preferably at least five times greater than the increase in the collar distance.

In another embodiment, the movable and fixed pipeline support between the respective first and second support members compress much less in response to a certain load than the extension of the pipeline between the first and second collars and between the third and fourth collars in response to the same load, such that the greater part of the difference between the collar distance and the support member distance is closed by an increase in the distance between the respective collars of the pipeline or pipe section.

In this embodiment, the deformation capability of the pipeline is used effectively and the pipeline support can be regarded as a more or less non-deformable object.

The words "much less" indicate that the decrease in the support member distance is at least three times, preferably at least five times smaller than the increase in the collar distance.

In another embodiment, deformable rings are positioned between the collars and the support members. The deformable rings further distribute the forces more evenly over the respective support members.

The present invention also relates to a method of laying a marine pipeline, comprising providing a pipeline laying vessel having a J-lay system and a pipeline or pipe section,
  the J-lay system comprising a fixed pipeline support and a movable pipeline support configured for supporting a pipeline which is suspended from the pipeline-laying vessel,
    the movable pipeline support comprising:
      at least a first movable support member configured for engaging a first collar on the pipeline,
      at least a second movable support member configured for engaging a second collar on the pipeline,
      wherein the first and second movable support members are spaced apart at a movable support member distance along an intended firing line,
    the fixed pipeline support comprising:
      at least a first fixed support member configured for engaging a third collar on the pipeline,
      at least a second fixed support member configured for engaging a fourth collar on the pipeline,
      wherein the first and second fixed support member are spaced apart at a fixed support member distance along an intended firing line
  the pipeline or pipe section comprising:
    a first set of collars comprising at least a first collar and a second collar constructed to engage a movable pipeline support of a J-lay system,
    a second set of collars comprising at least a third collar and a fourth collar constructed to engage a fixed pipeline support of a J-lay system,
wherein the second collar is positioned at a collar distance from the first collar, and wherein the fourth collar is positioned at a collar distance from the third collar,
  the first collar being configured to engage the first movable support member,
  the second collar being configured to engage the second movable support member,
  the third collar being configured to engage the first fixed support member,
  the fourth collar being configured to engage the second fixed support member,
  wherein:
a) the first movable support member is resiliently mounted according to a substantially predetermined load-movement relationship relative to the second movable support member, and the first fixed support member is resiliently mounted according to a substantially predetermined load-movement relationship relative to the second fixed support member,
and/or
b) wherein the pipe section between the first and second collar and between the third and fourth collar is resilient according to a predetermined load-elongation relationship, the method comprising exerting a force from the first or third collar of the pipeline or pipe section on the first movable support member or the first fixed support member, thereby increasing one of the collar distances and/or decreasing one of the support distances such that the second collar engages the second movable support member or the fourth collar engages the second fixed support member.

It is possible to distribute the total load of the pipeline substantially equally over the available collars.

The invention also relates to a vessel comprising a pipeline support according to the present invention.

DETAILED DESCRIPTION OF THE INVENTION

Figures 1A, 1B, 1C:
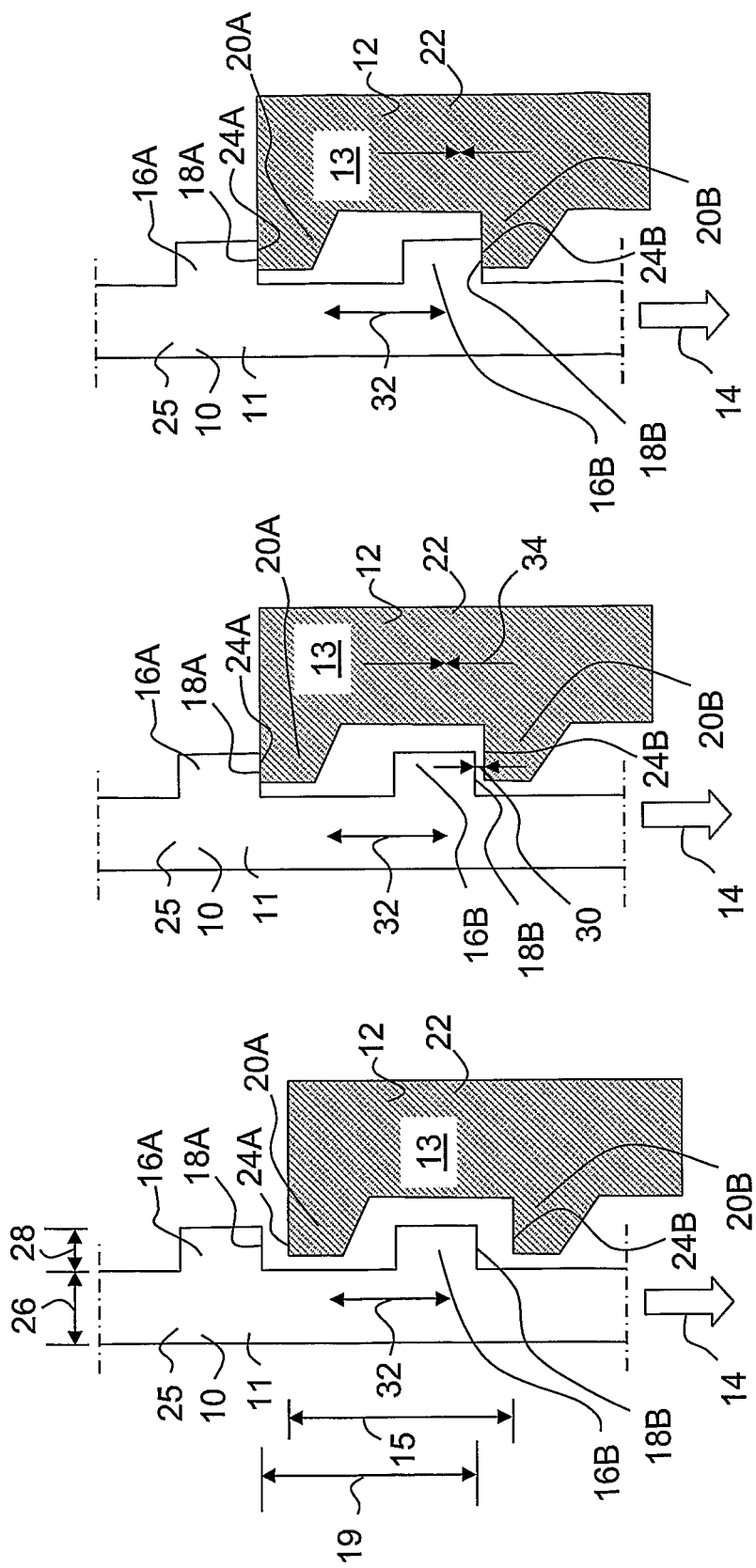
FIG. 1A shows a cross-sectional view of a step in the suspension of a pipeline from the pipeline support according to the invention.
FIG. 1B shows a cross-sectional view of a subsequent step in the suspension of a pipeline from the pipeline support according to the invention.
FIG. 1C shows a cross-sectional view of a next step in the suspension of a pipeline from the pipeline support according to the invention.

FIGS. 1A, 1B and 1C show a section 10 of a pipeline and a pipeline support 12 of a J-lay system. The pipeline support 12 can be a fixed pipeline support or a movable pipeline support. A fixed pipeline support is generally also referred to as a hang-off table (HOT). A movable pipeline support is often referred to as a movable clamp. The pipe section 10 may form the free end of a pipeline which is suspended from the vessel. The pipeline may extend all the way down to a seabed, which in practice may be a distance of several thousands of meters.

Because a substantial length of pipeline is suspended from the vessel, a substantial axial force 14 is present. This axial force 14 is to be transferred to the pipeline support 12. To this end, the pipe section 10 is provided with at least a first collar 16A and a second collar 16B. It will be appreciated by the skilled person that such collars may have many different sizes and shapes. For instance, the collars may not extend completely around the pipeline but may protrude from the pipe wall over a limited circumferential length. The collars may have a rounded form when viewed in cross-section, such as a semi-circular form or a rectangular form having rounded corners.

The collars 16A, 16B are provided with a first support surface 18a and a second support surface 18b respectively.

The first and second support surfaces 18A, 18b are provided at a collar distance 19 from one another In a suitable embodiment, the support surfaces are angled relative to the firing line (not shown in FIGS. 1A-1C).

The pipeline support 12 is provided with support members 20A and 20B. The support members protrude from a frame 22 of the pipeline support. The support members 20A, 20B have support surfaces 24A, 24B. The first and second support surface 24a, 24B are provided at a support member distance 15 from one another.

The pipeline 10 has an outer wall 25 having a wall thickness 26 and the collars 16A, 16B protrude over a distance 28 from the outer wall 25.

The collar distance 19 is smaller than the support member distance 15.

FIG. 1B shows how in use the pipeline 10 (or pipe section 10) contacts the pipeline support 12. The first support surface 18A of the pipeline 10 contacts the first support surface 24A of the first support member 20A. A gap 30 (also indicated with δ) occurs between the second support surface 18B of the pipeline 10 and the second support surface 24B of the pipeline support. Due to the force 14, the section 11 of pipeline 10 between the first support surface 18A and the second support surface 18B will extend and the section 13 of the pipeline support 12 between the first support member 20A and the second support member 20B will be compressed, as is indicated with arrows 32 and 34. The pipeline 10 and the pipeline support 12 deform elastically and act as springs.

It is preferred that the pipeline support 12 is much stiffer than the pipeline 10, such that the pipeline 10 will extend much more than the pipeline support 12 will compress.

It is also possible that the pipeline 10 is much stiffer than the pipeline support 12, so that the compression of the pipeline support 12 is much greater than the extension of the pipeline 10.

Due to the extension of the pipeline section 11 and the compression of the pipeline support 12, the gap 30 will close, so that the second support surface 18B of the pipeline and the second support surface 24B of the pipeline support 12 engage. This is shown in FIG. 1C.

When the stiffness of the pipeline 10 and the pipeline support 12 are known, it is possible to determine a difference between distance 19 and distance 15, i.e. a gap 30, which is required for the second support surface 18B to engage the second support surface 24B of the pipeline support 12 for a certain force F. This force F occurs at the first support surface 18A.

Thus, it is possible to determine a relationship between δ and F. For instance, the pipeline 10 and the pipeline support 12 may be designed such that the second support surface 18B will meet the second support member 20B when the load which is transferred via the first support surface is 1000 kN.

In such a way, it can be determined that the total load is distributed over the first and second support surfaces 18A, 18B according to a more or less predetermined distribution. A substantial equal distribution may be obtained.

The parameters which determine the value of the force at which the second support surface 18b meets the second support member 20B include:
1. The difference δ between the collar distance 19 and the support member distance 15,
2. The tensile stresses which occur in the section 13 of the pipe 10 and the compressive stresses which occur in the section 13 of the pipeline support 12, which tensile stresses are determined by the size and shape of the pipeline 10 and which compressive stresses are determined by the size and shape of the pipeline support 12,
3. The elasticity of the respective materials from which both the pipeline and the pipeline support are made, i.e. the modulus of elasticity E.

When the Force F is known which acts on the first support surface 18A, the tensile stresses in the pipeline 10 and the compressive stresses in the pipeline support 12 may be calculated based on the size and shape of these parts. Via Hooke's law, the known stresses and the known modulus of elasticity determine the strain in the pipeline 10 and the strain in the pipeline support 12, i.e. the strain can be calculated based on the stresses and the elasticity modulus.

When the strain is known, the extension of the pipeline 10 and the compression of the pipeline support 12 can be calculated based on the collar distance 19 and the support member distance 15. The combined extension and compression result in the gap 30 which is to be created in order to ensure that the second support surface 18B and the second support member 20B meet at the required Force F. Of course it is also possible to reverse this computation, i.e. to calculate the force F when the gap 30 is known.

Thus, it is possible to tune the gap 30 in such a way that the total load 14 on the pipeline is distributed substantially equally over the two collars 16A, 16B. This provides the possibility of replacing one large collar (not shown) of the prior art by two smaller collars 16, such that the distance 28 by which the collars 16 protrude from the side wall of the pipeline 10 is decreased. Or, if the size of the collars is maintained substantially the same, it is possible to increase the total load which can be transferred from the pipeline 10 to the pipeline support 12.

Figure 2:
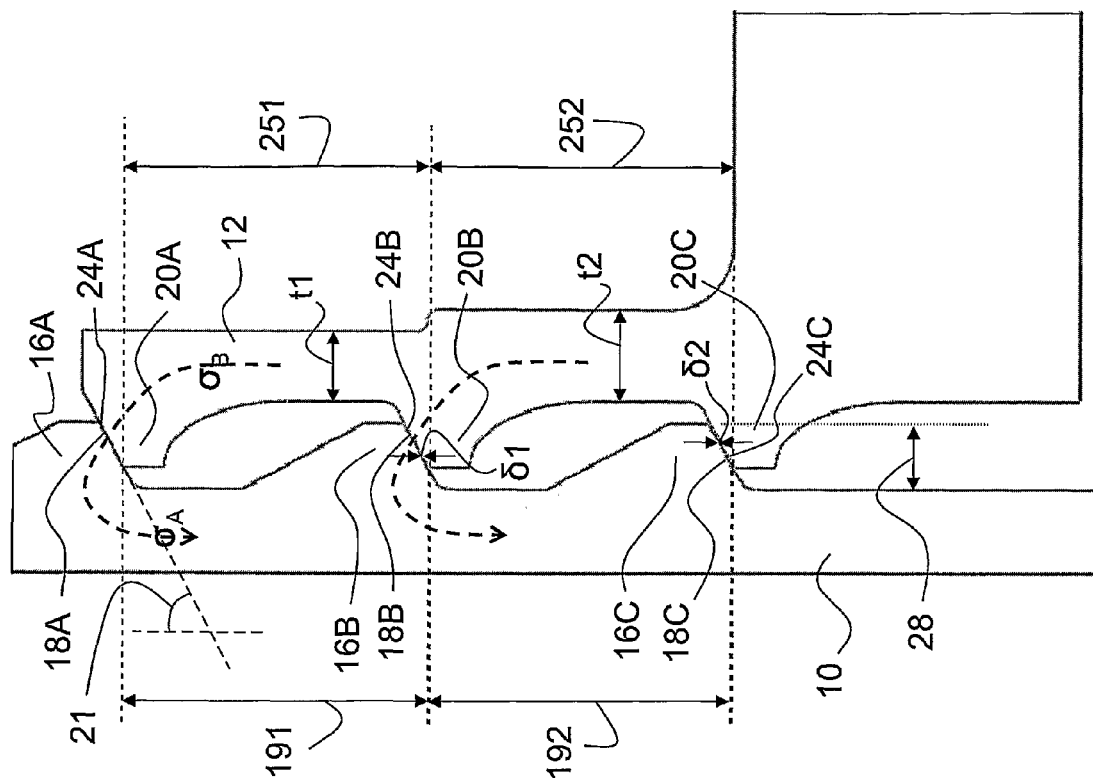
FIG. 2 shows an partial cross-sectional view of another embodiment of the invention.

FIG. 2 shows another embodiment of the invention, in which the pipeline 10 comprises three collars 16A, 16B, 16C and three support surfaces 18A, 18B, 18C for a movable pipeline support. The pipeline comprises three similar collars comprising support surfaces for a fixed pipeline support which are not shown in FIG. 2 and discussed further in relation to FIGS. 3A and 3B. The support surfaces are oriented at an angle 21 relative to the main longitudinal axis of the pipeline 10. In this example the angle 21 is <90 degrees, which allows a further reduction in the distance 28 over which the collars protrude from the wall of the pipeline 10. However, an angle of 90 degrees is possible as well. The first and second support surface 18A, 18B are located at a collar distance 191 from one another, and the second and third support surfaces 18b, 18c are located at a collar distance 192 from one another.

The pipeline support 12 is provided with three pipeline support members 20A, 20B and 20C which are provided at support member distances 251, 252 from one another, respectively. The support member distance 251 is greater than the collar distance 191 and the support member distance 252 is greater than the collar distance 192, creating gaps δ1 and δ2. Since the gaps are small relative to the size of the pipe and the support, they are not distinctly visible in FIG. 2. The fixed pipeline support and the movable pipeline support each comprise three support members.

By deliberately introducing the gaps δ1 and δ2, it is possible to make use of the elasticity of the materials of the pipeline and the pipeline support.

By manipulating δ1, 191 and t1 it is possible to control at what percentage of the total load the second support surfaces 18b, 24B will engage one another. The formula that applies is:

$$\delta_1 = (\sigma_A - \sigma_B)\frac{L_1}{E}$$

The same applies for the second gap δ2.

$$\delta_2 = (\sigma_A - \sigma_B)\frac{L_2}{E} + \delta_1$$

In the equation, $\sigma_A$ is the tensile stress (positive value for tension) in the pipeline 10, $\sigma_B$ is the compressive stress (positive value for compression) in the pipeline support 12, $L_1$ is collar distance 191, and $L_2$ is the collar distance 192.

It is also possible to use four, five or six support surfaces for each of the fixed and movable pipeline supports which are spaced apart in the direction of the intended firing line.

A skilled person will understand that the axial force in the pipeline increases stepwise when travelling in a downstream direction 80. Below each support surface, the axial force increases when compared to the axial force above the support surface.

Likewise, in the pipeline support 12, the axial force increases when travelling in a downstream direction. It can be seen in FIG. 2 that the thickness $t_2$ of the pipeline support 12 between the second and third pipeline support 20B and 20C is greater than the thickness $t_1$ of the pipeline support 12 between the first and second support member 20A and 20B. In this way, the increased force does not lead to an increased compressive stress and/or strain in the pipeline support 12 between the second support member 20B and third support member 20C.

Figures 3A, 3B:
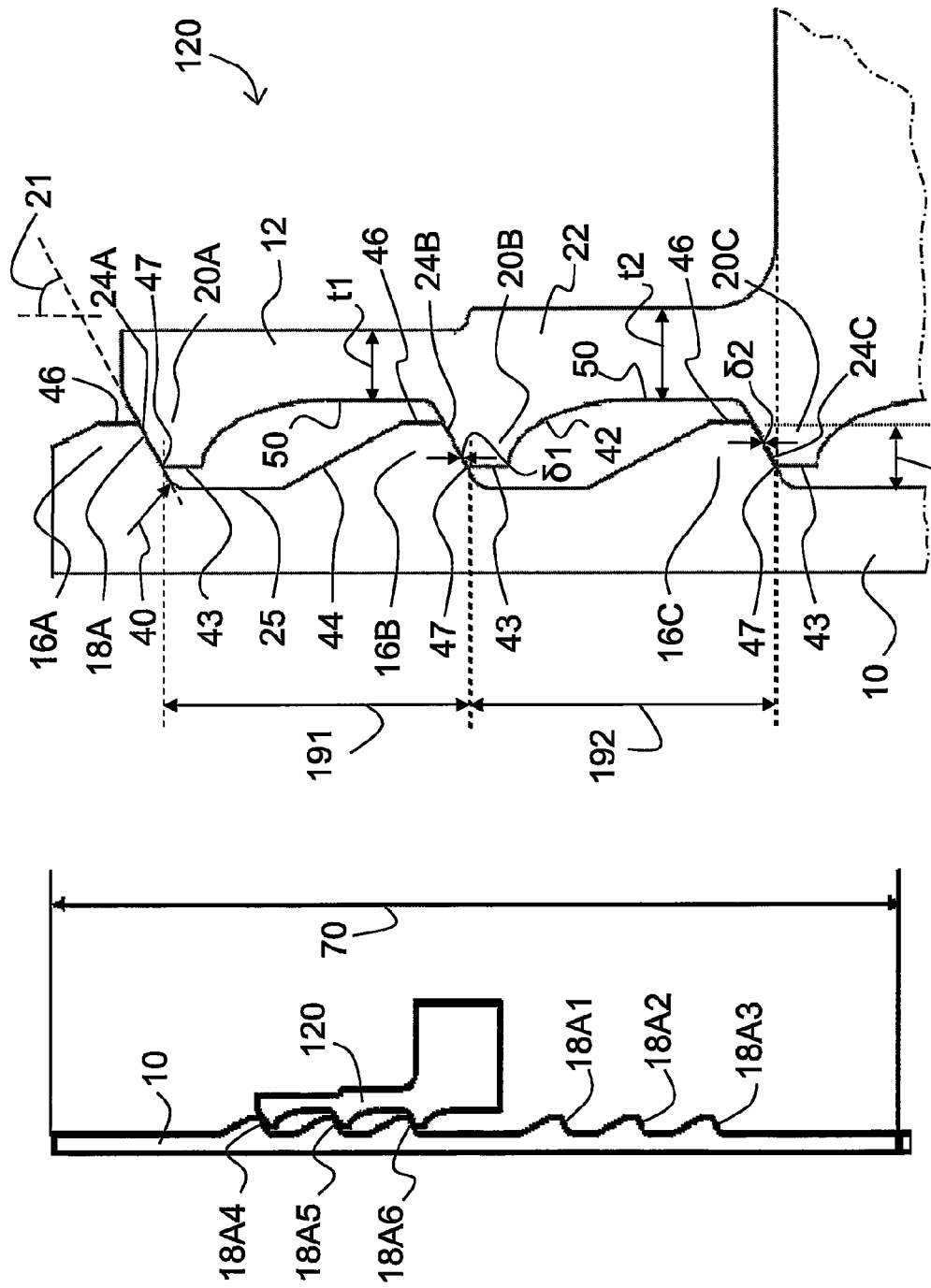
FIG. 3A shows a schematic cross-sectional view of the embodiment of FIG. 2.
FIG. 3B shows a more detailed cross-sectional view of the embodiment of FIGS. 2 and 3A.

FIGS. 3A and 3B further show the embodiment of FIG. 2, wherein three support members are provided. It can be seen in FIG. 3A that three support surfaces 18A1, 18A2, 18A3 on the pipeline 10 are provided for a fixed pipeline support 12 and three support surfaces 18A4, 18A5, 18A6 are provided for a movable pipeline support 120. The angle 21 of the support surfaces relative to the main longitudinal axis of the pipeline is about 60 degrees. The respective support surfaces distance 191, 192 are in the order of 50 mm. The gaps δ1 and δ2 are in the order of 0.10 to 0.50 mm. Generally the gaps are kept as small as possible in order to keep the total length of the upper pipe section as small as possible, which is preferred from an economical point of view. A typical total length 70 of the upper end of a pipe section will be approximately 800 to 1000 mm for the given gap values.

The form of the pipeline support members 20A, 20B, 20C downstream of (or under) the actual support members is rounded, see radius 42. Or in other words, the transition of the support members 20A, 20B, 20C into the frame 22 is rounded in order to reduce peak stresses.

The transition of the collars to the pipe 10 is also rounded for the same reason which is indicated with radius 40. Different radii of curvature may be used for both roundings.

The form of the collars 16A, 16B 16C is thus defined by a curved section 40 which goes over in the actual support surface 18A1,2,3 resp. 18A4,5,6. The support surfaces end at an outer end of the collar 16A, 16B, 16c. The collars each have a part 46 which extends parallel to the pipe wall 25. Next, an inclined section 44 tapers inward back to the pipe wall 25. Other forms are also possible.

The form of the support members 20A, 20B, and 20C is defined by a rounded section 42, followed by a section 43 which extends parallel to the pipe wall 25. This section ends at a corner 47 where the support surfaces 24A, 24B, 24C of the support member 20A, 20B, 20C starts. The support surfaces 24A, 24B, 24C are oriented at an inclination and taper outwardly, back to a wall 50 of the frame 22.

In the embodiment shown in FIG. 3, the thicknesses of the pipeline support 12 are calculated as 16 mm for t1 and 21 mm for t2.

Generally, the initial gaps 30 are calculated analytically. For a known or chosen value of thickness of the pipeline support 12, an optimal gap that would be required to obtain equal load distribution can be calculated. Also upper and lower gap limits can be calculated.

Figure 4:
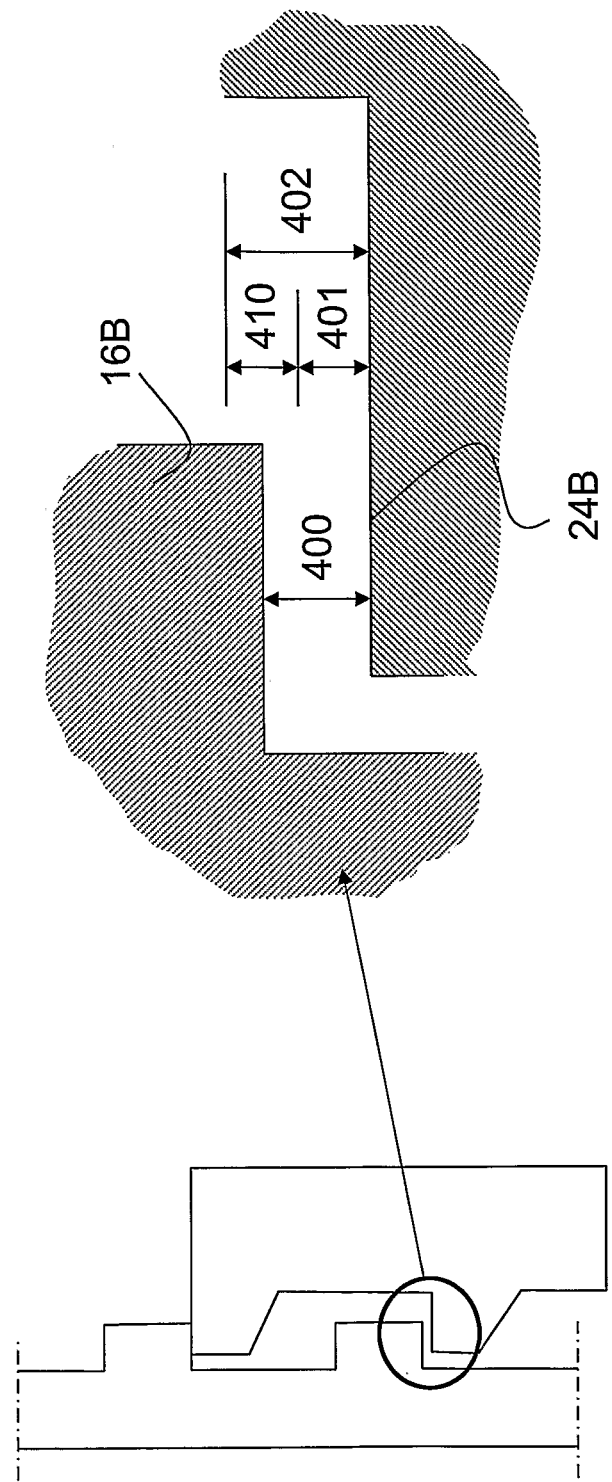
FIG. 4 shows a detailed cross-sectional view showing allowable margins in the combination of the pipeline support and the pipe section of the invention.

This is illustrated in FIG. 4. A detail of the gap between collar 16B and support surface 24B of FIG. 1B is schematically indicated. A nominal gap 400 is the gap where an optimal load distribution is obtained, for instance 50%-50% for a system with two support members. The distance between the minimum gap 401 and maximum gap 402 is the margin 410 which is available for fabrication tolerances. A deviation from the nominal gap 400 will result in a different load distribution between the support members. A smaller than nominal gap will lead to a lower than predicted load on an upper support member, and a larger than nominal gap will result in a higher than predicted load on an upper support member. Depending on the allowed deviation, for instance 60%-40% to 40%-60% between an upper and a lower support member, the allowable fabrication tolerances can be determined. The smaller the allowed deviation from a nominal gap 400 is, the tighter the fabrication tolerances will become.

It will be obvious to a person skilled in the art that numerous changes in the details and the arrangement of the parts may be varied over considerable range without departing from the spirit of the invention and the scope of the claims.

The invention claimed is:

1. A combination of a J-lay system and a pipeline or a pipe section,
   the J-lay system comprising a fixed pipeline support and a movable pipeline support configured for supporting a pipeline which is suspended from a pipeline-laying vessel,
   the movable pipeline support comprising:
     at least a first movable support member configured for engaging a first collar on the pipeline,
     at least a second movable support member configured for engaging a second collar on the pipeline,
   wherein the first and second movable support members are spaced apart at a movable support member distance along an intended firing line,
   the fixed pipeline support comprising:
     at least a first fixed support member configured for engaging a third collar on the pipeline,
     at least a second fixed support member configured for engaging a fourth collar on the pipeline,
   wherein the first and second fixed support member are spaced apart at a fixed support member distance along the intended firing line,
   the pipeline or pipe section comprising:
   a first set of collars comprising at least a first collar and a second collar constructed to engage a movable pipeline support of a J-lay system, wherein the second collar is positioned at a first collar distance from the first collar,
   a second set of collars comprising at least a third collar and a fourth collar constructed to engage a fixed pipeline support of a J-lay system, and wherein the fourth collar is positioned at a second collar distance from the third collar,
   wherein:
     the first collar is configured to engage the first movable support member,
     the second collar is configured to engage the second movable support member, the third collar is configured to engage the first fixed support member,
the fourth collar is configured to engage the second fixed support member,
wherein the first collar distance is smaller than the movable support member distance and the second collar distance is smaller than the fixed support member distance and wherein:
a) the first movable support member is resiliently mounted according to a substantially predetermined load-movement relationship relative to the second movable support member, and the first fixed support member is resiliently mounted according to a substantially predetermined load-movement relationship relative to the second fixed support member, such that the second collar engages the second movable support member or the fourth collar engages the second fixed support member
and/or
b) wherein the pipe section between the first and second collars and between the third and fourth collars is resilient according to a predetermined load-elongation relationship, such that when a certain axial load is applied on the first collar or on the third collar, the collar distance increases by a substantially predetermined value such that the second collar engages the second movable support member or the fourth collar engages the second fixed support member.

2. The combination of claim 1, wherein the difference between the collar distance and the movable and fixed support member distance is constructed for matching the substantially predetermined load-movement relationship of the support members of the movable and fixed pipeline support and/or to the substantially predetermined load-elongation relationship of the pipeline or pipe section between the collars, such that the second collar engages the second movable support member when the load on the first support member is a predetermined portion of the projected total load of the pipeline on the vessel and the fourth collar engages the second fixed support member when the load on the first fixed support member is a predetermined portion of the projected total load of the pipeline on the vessel.

3. The combination of claim 2, wherein the predetermined portion is between 30% and 70% of the projected total load of the pipeline on the vessel.

4. The combination of claim 1, wherein the first and second movable support member are connected to one another via a movable frame, and wherein the first and second fixed support member are connected to one another via a fixed frame and wherein
a) at least part of the movable and fixed frame are configured to deform substantially elastically, such that the movable and fixed frame act as a spring having the substantially predetermined load-movement relationship
and/or
b) wherein a pipe section extending between the first and second collar and between the third and fourth collar is constructed to deform elastically, in such a way that a total suspension load of the pipeline on the vessel is distributed over the first and second movable support members or over the first and second fixed support members.

5. The combination of claim 1, wherein the pipeline comprises six or more collars spaced apart in the direction of a main longitudinal axis of the pipeline, three or more collars for the movable pipeline support and three or more collars for the fixed pipeline support and wherein the movable pipeline support comprises three or more movable support members which are spaced apart, and wherein the fixed pipeline support comprises three or more fixed support members which are spaced apart and wherein the distances between the collars are smaller than the distances between the movable support members and between the fixed support members and wherein the load-movement relationships and the load elongation relationships are chosen such that in use, the total load which the pipeline exerts on the pipeline laying vessel is spread over the respective collars which engage the movable pipeline support or over the collars which engage the fixed pipeline support.

6. The combination of claim 1, wherein the movable and fixed pipeline support between the respective first and second support members is constructed to compress much more in response to a certain load than the extension of the pipeline between the first and second collars and between the third and fourth collars in response to the same load, such that the greater part of the difference between the collar distance and the support member distance is closed by a decrease in the distance between the respective support members.

7. The combination of claim 1, wherein the movable and fixed pipeline support between the respective first and second support members is constructed to compress much less in response to a certain load than the extension of the pipeline between the first and second collars and between the third and fourth collars in response in response to the same load, such that the greater part of the difference between the collar distance and the support member distance is closed by an increase in the distance between the respective collars of the pipeline or pipe section.

8. The combination of claim 1, wherein deformable rings are positioned between the collars and the support members.

9. The combination of claim 1, wherein the collar distance is smaller than the support member distance.

10. A method of laying a marine pipeline, comprising providing a pipeline laying vessel having a J-lay system and a pipeline or pipe section,
the J-lay system comprising a fixed pipeline support and a movable pipeline support configured for supporting a pipeline which is suspended from the pipeline-laying vessel,
the movable pipeline support comprising:
at least a first movable support member configured for engaging a first collar on the pipeline,
at least a second movable support member configured for engaging a second collar on the pipeline,
wherein the first and second movable support members are spaced apart at a movable support member distance along an intended firing line,
the fixed pipeline support comprising:
at least a first fixed support member configured for engaging a third collar on the pipeline,
at least a second fixed support member configured for engaging a fourth collar on the pipeline,
wherein the first and second fixed support member are spaced apart at a fixed support member distance along the intended firing line
the pipeline or pipe section comprising:
a first set of collars comprising at least a first collar and a second collar constructed to engage a movable pipeline support of a J-lay system,
a second set of collars comprising at least a third collar and a fourth collar constructed to engage a fixed pipeline support of a J-lay system, wherein the second collar is positioned at a first collar distance from the first collar, and wherein the fourth collar is positioned at a second collar distance from the third collar, the first collar being configured to engage the first movable support member, the second collar being configured to engage the second movable support member, the third collar being configured to engage the first fixed support member, the fourth collar being configured to engage the second fixed support member, wherein the first collar distance is smaller than the movable support member distance and the second collar distance is smaller than the fixed support member distance and wherein:

a) the first movable support member is resiliently mounted according to a substantially predetermined load-movement relationship relative to the second movable support member, and the first fixed support member is resiliently mounted according to a substantially predetermined load-movement relationship relative to the second fixed support member, and/or b) wherein the pipe section between the first and second collar and between the third and fourth collar is resilient according to a predetermined load-elongation relationship, the method comprising exerting a force from the first or third collar of the pipeline or pipe section on the first movable support member or the first fixed support member, thereby increasing one of the collar distances and/or decreasing one of the support distances such that the second collar engages the second movable support member or the fourth collar engages the second fixed support member.

11. The method according to claim 10, wherein the total load of the pipeline is distributed substantially equally over the first and second collars or over the third and fourth collars.

12. The method according to claim 10, wherein the pipe section or pipeline is an inner pipe of a pipe-in pipe assembly.

* * * * *